US008828267B2

(12) United States Patent
Pfeffinger et al.

(10) Patent No.: US 8,828,267 B2
(45) Date of Patent: Sep. 9, 2014

(54) USE OF A STEREOISOMER MIXTURE OF DIAMINOMETHYLCYCLOHEXANE AS A HARDENER FOR EPOXY RESINS

(75) Inventors: Joachim Pfeffinger, Ludwigshafen (DE); Daniela Malkowsky, Speyer (DE); Stephan Goettke, Bakum (DE)

(73) Assignee: BASF SE, Ludwigshafen (DE)

( * ) Notice: Subject to any disclaimer, the term of this patent is extended or adjusted under 35 U.S.C. 154(b) by 174 days.

(21) Appl. No.: 13/496,993

(22) PCT Filed: Sep. 20, 2010

(86) PCT No.: PCT/EP2010/063794
§ 371 (c)(1),
(2), (4) Date: May 10, 2012

(87) PCT Pub. No.: WO2011/033104
PCT Pub. Date: Mar. 24, 2011

(65) Prior Publication Data
US 2012/0226017 A1    Sep. 6, 2012

(30) Foreign Application Priority Data
Sep. 18, 2009  (EP) .................................... 09170694

(51) Int. Cl.
C08G 59/50       (2006.01)
C08L 63/00       (2006.01)
C08L 63/02       (2006.01)
C08L 63/04       (2006.01)

(52) U.S. Cl.
CPC ............. *C08G 59/5026* (2013.01); *C08L 63/00* (2013.01)
USPC ....... 252/182.13; 525/504; 525/523; 528/122

(58) Field of Classification Search
None
See application file for complete search history.

(56) References Cited

U.S. PATENT DOCUMENTS

| | | | | |
|---|---|---|---|---|
| 5,025,078 A * | 6/1991 | Lucas et al. | .................... | 528/120 |
| 5,663,443 A * | 9/1997 | Kiel et al. | ...................... | 564/451 |
| 5,741,929 A * | 4/1998 | Darsow et al. | ................ | 564/450 |
| 5,773,657 A | 6/1998 | Rütter et al. | | |
| 6,248,924 B1 | 6/2001 | Rühl et al. | | |
| 6,894,193 B2 * | 5/2005 | Zehner et al. | .................. | 564/420 |
| 2010/0292510 A1 * | 11/2010 | Pfeffinger et al. | ............ | 564/338 |
| 2011/0137083 A1 | 6/2011 | Pfeffinger | | |
| 2011/0251439 A1 | 10/2011 | Mirk et al. | | |
| 2012/0031771 A1 | 2/2012 | Malkowsky et al. | | |

FOREIGN PATENT DOCUMENTS

| | | | |
|---|---|---|---|
| DE | 21 32 547 | | 1/1973 |
| DE | 2132547 A | * | 1/1973 |
| DE | 196 24 485 | | 1/1998 |
| EP | 0 443 344 | | 8/1991 |
| JP | 4-213318 A | | 8/1992 |
| JP | 9-253492 A | | 9/1997 |
| JP | 10-72377 A | | 3/1998 |
| JP | 11-513362 A | | 11/1999 |

OTHER PUBLICATIONS

International Search Report issued Mar. 10, 2011 in PCT/EP10/63794 filed Sep. 20, 2010.
U.S. Appl. No. 13/319,830, filed Nov. 30, 2011, Mirk, et al.
U.S. Appl. No. 13/321,323, filed Nov. 21, 2011, Eling, et al.
U.S. Appl. No. 13/382,740, filed Jan. 6, 2012, Pfeffinger, et al.
U.S. Appl. No. 13/383,238, filed Jan. 10, 2012, Lutter, et al.
Japanese Office Action issued Feb. 3, 2014 in Patent Application No. 2012-529297.

* cited by examiner

*Primary Examiner* — Robert Sellers
(74) *Attorney, Agent, or Firm* — Oblon, Spivak, McClelland, Maier & Neustadt, L.L.P.

(57) ABSTRACT

The present invention provides a composition which comprises at least one epoxy resin and a mixture comprising the 7 stereoisomers of diaminomethylcyclohexane in very specific ratios relative to one another, a process for preparing the composition, the use of the composition for producing hardened epoxides, adhesives, composite materials and moldings, a mixture comprising the 7 stereoisomers of diaminomethylcyclohexane in the specific ratios, and the use of this mixture for producing the composition.

19 Claims, No Drawings

USE OF A STEREOISOMER MIXTURE OF DIAMINOMETHYLCYCLOHEXANE AS A HARDENER FOR EPOXY RESINS

The present invention provides a composition which comprises at least one epoxy resin and a mixture comprising the 7 stereoisomers of diaminomethylcyclohexane in very specific ratios relative to one another, a process for preparing the composition, the use of the composition for producing hardened epoxides, adhesives, composite materials and moldings, a mixture comprising the 7 stereoisomers of diaminomethylcyclohexane in the specific ratios, and the use of this mixture for producing the composition.

The fact that epoxy resins can be cured in different ways is well known and has been described extensively.

Nowadays, hardened epoxy resins find use in the sectors of coatings, floor coatings, composite materials such as CFK and GFK (carbon fiber- and glass fiber-reinforced plastic refer to a fiber-plastic composite material in which carbon or glass fibers, usually in a plurality of layers, are embedded as reinforcement into a plastics matrix) and adhesives. Recently, the use of epoxy resins for producing large-area glass fiber-reinforced composite materials has become particularly important, since they are frequently used as a material for rotor blades in wind turbine construction. Owing to the enormous size of the components, problem-free injection has to be ensured. For the epoxy resin systems, this means a long open time (pot life) in which the viscosity of the system is still low and no gelation occurs. When the systems are too reactive, the large mold cannot be filled completely. On the other hand, the resin/hardener mixture must harden fully even at temperatures of <120° C. within a few hours after the mold filling operation, and lead to sufficiently stable material properties since the blades must later withstand enormous stresses.

EP-B 0 443 344 and applications cited therein give an extensive description of the present state of the art regarding hardening of various epoxy resins with hardeners customary on the market. An important role is played by the amine hardeners, since they are used in different chemical structures.

EP-B 0 443 344 gives one description of the use of diaminomethylcyclohexane as a hardener of epoxy resin systems. This discloses the influence of the regioisomer distribution on the hardening rate of epoxy resins. There is no indication that particular ratios of the seven stereoisomers of diaminomethylcyclohexane as a mixture have any influence on the hardening behavior of a composition comprising an epoxy resin and the mixture.

In principle, amine hardeners are classified according to their chemical structure into aliphatic, cycloaliphatic or aromatic types. In addition, classification on the basis of the degree of substitution of the amino group is possible, which may be primary, secondary or else tertiary. For the tertiary amines, however, a catalytic hardening mechanism of epoxy resins is postulated, whereas the formation of the polymer network is based on stoichiometric hardening reactions for secondary and primary amines.

In general, it has been shown that, among the primary amine hardeners, the aliphatic amines exhibit the highest reactivity in epoxy hardening. The cycloaliphatic amines typically react somewhat more slowly, whereas the aromatic amines show by far the lowest reactivity.

In addition, primary amines react significantly more rapidly than corresponding secondary amines from the same structure class. It is likewise significant whether the amino group is substituted on a primary or secondary carbon atom.

These known reactivity differences are utilized in the hardening of epoxy resins in order to be able to adjust the processing time and the mechanical properties of the hardened epoxy resins as required.

For fast-hardening systems with hardening times of ≤10 min, for example adhesives, short-chain aliphatic amines are frequently used, whereas a longer open time (pot life) is required in the production of large-area composite materials in order to be able to fill the mold homogeneously. Predominantly cycloaliphatic amines, for example isophoronediamine (IPDA) are used here.

When the mixture of epoxy resin and hardener or hardener mixture hardens too rapidly, the brittleness of the thermoset obtained will be too high. Further additives must then be added to modify the toughness, which make the applications significantly more complex and more costly. In addition, the composition comprising epoxy resin and hardener system must not already harden during the introduction into the mold or the application to a substrate, since it can lead to stresses in the polymer network which significantly lower long-term durability.

Problem-free processing by adjusting the reactivity of the hardener as required is of great significance in the current production of coatings, floor coatings, moldings, (fiber-reinforced) composite materials and adhesives.

Typically, this problem is solved by skillful combination of the different aminic hardeners. Frequently, however, the mixing gives problems owing to incompatibility and viscosity differences or excessive reactivity differences. This leads to the effect that one amine hardener component is more compatible with epoxy resin than the other amine component. There is therefore no simultaneous depletion of the hardener components, and the result is instead irregular hardening with poor material properties or surface properties.

The compatibility of amine hardeners with one another is therefore at best when the chemical base structures are very similar. For example, low-reactivity aromatic amines can be combined very well with one another. These mixtures exhibit good storage stabilities even over a wide temperature range and a long period. In the case of combination of reactive aliphatic amines with polycyclic aromatic amines, phase separations can rapidly occur, which lead to inhomogeneous mixtures and hence to inhomogeneous hardening.

It is known that the reactivity of amines of the same group (aromatic, cycloaliphatic, ali-phatic) can also be adjusted by varying the substitution pattern.

As has been shown in EP 0443 344, the different regioisomers can achieve a reactivity difference. EP-B 0443 344 does not state, however, that the stereoisomer distribution also exhibits a considerable influence on the hardening behavior in epoxy resins.

It is therefore an object of the present invention to provide a composition which enables the hardening thereof to be matched as required to the hardening conditions of the end products to be produced.

This object is achieved by a composition comprising
a) at least one epoxy resin and
b) a mixture comprising the 7 isomers of 2,4- and 2,6-diamino-1-methylcyclohexane in a ratio of 75 to 95% by weight of 2,4- to 5 to 25% by weight of 2,6-diamino-1-methylcyclohexane, wherein the GC area percentages of the 7 isomers, in order of ascending retention time, are determined by gas chromatography with a column of length 30 m, internal diameter 0.25 mm and film thickness 0.5 μm, which is operated with helium as the mobile phase and comprises 35% by weight of diphenyl and 65% by weight of dimethylpolysiloxane as the stationary phase, is operated at temperatures in the range from 100 to 250° C. over the entire measurement, and a flame ionization detector which is operated at 280° C. is used, by dissolving the mixture comprising 7 isomers, after distillation, in tetrahydrofuran, injecting the solution into the gas chromatograph with an injection temperature of 100° C., an inlet pressure of 1 bar and a heating rate of 1° C./min is established until a temperature of 120° C. is attained, then the heating rate is switched to 5° C./min and maintained until the end temperature of 250° C., then the temperature of 250° C. is held for 10 min, and the rate of the helium enriched with the mixture of 40 ml/min is established over the entire measurement and the measurement is conducted with a split ratio of 1 to 40, and are for peak 1 in the range from 4.0 to 49.0%,
for peak 2 in the range from 0.3 to 9.0%,
for peak 3 in the range from 9.0 to 19.0%
for peak 4 in the range from 11.0 to 30.0%,
for peak 5 in the range from 3.0 to 10.0%
for peak 6 in the range from 8.0 to 40.0% and
for peak 7 in the range from 1.0 to 10.0%, where the sum of the GC area percentages based on the amount of 2,4- and 2,6-diaminomethylcyclohexane used adds up to 100%, and a mixture comprising the 7 isomers of 2,4- and 2,6-diamino-1-methylcyclohexane in a ratio of 75 to 95% by weight of 2,4- to 5 to 25% by weight of 2,6-diamino-1-methylcyclohexane, the GC area percentages of which, in order of ascending retention time, determined by the same gas chromatography method, are, for peak 1 in the range from 15.6 to 16.6%,
for peak 2 in the range from 0.1 to 0.4%,
for peak 3 in the range from 32.2 to 33.2%
for peak 4 in the range from 23.5 to 24.5%
for peak 5 in the range from 4.1 to 5.1%
for peak 6 in the range from 18.1 to 19.1% and
for peak 7 in the range from 2.6 to 3.6%, where the sum of the GC area percentages of peaks 1 to 7, based on the amount of 2,4- and 2,6-diaminomethylcyclohexane used, adds up to 100%, is excluded.

In an advantageous inventive composition, the 7 isomers of 2,4- and 2,6-diamino-1-methylcyclohexane are obtainable by hydrogenating a mixture comprising 75 to 85% by weight of 2,4-toluenediamine and 15 to 25% by weight of 2,6-toluenediamine In an advantageous inventive composition, the hydrogenation is performed with the aid of a ruthenium-comprising catalyst.

In an advantageous inventive composition, the hydrogenation has been performed in solution or melt at temperatures in the range of ≥210° C. and the GC area percentages are
for peak 1 in the range from 33.5 to 49.0%
for peak 2 in the range from 3.4 to 9.0%
for peak 3 in the range from 14.1 to 19.0%
for peak 4 in the range from 11.0 to 22.7%
for peak 5 in the range from 5.1 to 7.7%
for peak 6 in the range from 8.0 to 15.7%
for peak 7 in the range from 1.0 to 5.4%,
where the sum of the GC area percentages of peaks 1 to 7, based on the amount of 2,4- and 2,6-diamino-1-methylcyclohexane used adds up to 100%.

In an advantageous inventive composition, the hydrogenation has been performed in solution at mean temperatures in the range from 210 to 239° C. and the GC area percentages are
for peak 1 in the range from 33.5 to 45.9%
for peak 2 in the range from 3.4 to 5.6%
for peak 3 in the range from 14.1 to 16.1%
for peak 4 in the range from 16.9 to 22.7%
for peak 5 in the range from 6.6 to 7.7%
for peak 6 in the range from 12.1 to 15.7%
for peak 7 in the range from 2.5 to 5.4%,
where the sum of the GC area percentages of peaks 1 to 7, based on the amount of 2,4- and 2,6-diamino-1-methylcyclohexane used, adds up to 100%.

In an advantageous inventive composition, the hydrogenation has been performed in the melt at mean temperatures in the range from 210 to 239° C. and the GC area percentages are
for peak 1 in the range from 38.5 to 46.0%
for peak 2 in the range from 4.7 to 8.7%
for peak 3 in the range from 14.8 to 19.0%
for peak 4 in the range from 12.1 to 17.9%
for peak 5 in the range from 5.5 to 7.1%
for peak 6 in the range from 8.7 to 13.2%
for peak 7 in the range from 1.4 to 3.2%,
where the sum of the GC area percentages of peaks 1 to 7, based on the amount of 2,4- and 2,6-diamino-1-methylcyclohexane used, adds up to 100%.

In an advantageous inventive composition, the hydrogenation is performed in the melt at temperatures of ≥240° C. and the GC area percentages are
for peak 1 in the range from 46.0 to 49.0%
for peak 2 in the range from 5.7 to 9.0%
for peak 3 in the range from 16.2 to 19.0%
for peak 4 in the range from 11.0 to 16.8%
for peak 5 in the range from 5.1 to 6.5%
for peak 6 in the range from 8.0 to 12.0%
for peak 7 in the range from 1.0 to 2.4%,
where the sum of the GC area percentages of peaks 1 to 7, based on the amount of 2,4- and 2,6-diamino-1-methylcyclohexane used, adds up to 100%.

In an advantageous inventive composition, the hydrogenation is performed in solution at temperatures in the range from 170 to 209° C. and the GC area percentages are
for peak 1 in the range from 22.4 to 33.4%
for peak 2 in the range from 1.7 to 3.3%
for peak 3 in the range from 12.9 to 14.0%
for peak 4 in the range from 22.8 to 25.0%
for peak 5 in the range from 6.6 to 7.7%
for peak 6 in the range from 15.8 to 26.3%
for peak 7 in the range from 2.5 to 5.4%,
where the sum of the GC area percentages of peaks 1 to 7, based on the amount of 2,4- and 2,6-diamino-1-methylcyclohexane used, adds up to 100%.

In an advantageous inventive composition, the hydrogenation has been performed in the melt at mean temperatures in the range from 210 to 239° C. and the GC area percentages are
for peak 1 in the range from 38.5 to 46.0%
for peak 2 in the range from 4.7 to 8.7%
for peak 3 in the range from 14.8 to 19.0%
for peak 4 in the range from 12.1 to 17.9%
for peak 5 in the range from 5.5 to 7.1%
for peak 6 in the range from 8.7 to 13.2%
for peak 7 in the range from 1.4 to 3.2%,
where the sum of the GC area percentages of peaks 1 to 7, based on the amount of 2,4- and 2,6-diamino-1-methylcyclohexane used, adds up to 100%.

In an advantageous inventive composition, the hydrogenation is performed in solution at temperatures in the range from 130 to 149° C. and the GC area percentages are
for peak 1 in the range from 4.0 to 7.9%
for peak 2 in the range from 0.3 to 1.6%
for peak 3 in the range from 9.0 to 11.4%
for peak 4 in the range from 25.1 to 27.8%
for peak 5 in the range from 7.8 to 10.0% for peak 6 in the range from 36.9 to 40.0%
for peak 7 in the range from 8.5 to 10.0%,
where the sum of the GC area percentages of peaks 1 to 7, based on the amount of 2,4- and 2,6-diamino-1-methylcyclohexane used, adds up to 100%.

In an advantageous inventive composition, the hydrogenation is performed over a fixed bed catalyst at a maximum temperature of 155 to 175° C. and the GC area percentages are
for peak 1 in the range from 21.0 to 25.0%
for peak 2 in the range from 1.0 to 3.0%
for peak 3 in the range from 11.0 to 16.0%
for peak 4 in the range from 23.0 to 29.0%
for peak 5 in the range from 5.0 to 8.5%
for peak 6 in the range from 20.0 to 25.0%
for peak 7 in the range from 4.0 to 7.0%,
where the sum of the GC area percentages of peaks 1 to 7, based on the amount of 2,4- and 2,6-diamino-1-methylcyclohexane used, adds up to 100%.

In an advantageous inventive composition, the hydrogenation is performed with the aid of a ruthenium-containing catalyst.

In an advantageous inventive composition, the hydrogenation has been performed in solution or melt at mean temperatures in the range of ≥210° C. and the GC area percentages are
for peak 1 in the range from 33.5 to 49.0%
for peak 2 in the range from 3.4 to 9.0%
for peak 3 in the range from 14.1 to 19.0%
for peak 4 in the range from 11.0 to 22.7%
for peak 5 in the range from 5.1 to 7.7%
for peak 6 in the range from 8.0 to 15.7%
for peak 7 in the range from 1.0 to 5.4%,
where the sum of the GC area percentages of peaks 1 to 7, based on the amount of 2,4- and 2,6-diamino-1-methylcyclohexane used, adds up to 100%.

In an advantageous inventive composition, the hydrogenation is performed in solution at mean temperatures in the range from 210 to 239° C. and the GC area percentages are
for peak 1 in the range from 33.5 to 45.9%
for peak 2 in the range from 3.4 to 5.6%
for peak 3 in the range from 14.1 to 16.1%
for peak 4 in the range from 16.9 to 22.7%
for peak 5 in the range from 6.6 to 7.7%
for peak 6 in the range from 12.1 to 15.7%
for peak 7 in the range from 2.5 to 5.4%,
where the sum of the GC area percentages of peaks 1 to 7, based on the amount of 2,4- and 2,6-diamino-1-methylcyclohexane used, adds up to 100%.

In an advantageous inventive composition, the hydrogenation has been performed in the melt at mean temperatures in the range from 210 to 239° C. and the GC area percentages are
for peak 1 in the range from 38.5 to 46.0%
for peak 2 in the range from 4.7 to 8.7%
for peak 3 in the range from 14.8 to 19.0%
for peak 4 in the range from 12.1 to 17.9%
for peak 5 in the range from 5.5 to 7.1%
for peak 6 in the range from 8.7 to 13.2%
for peak 7 in the range from 1.4 to 3.2%,
where the sum of the GC area percentages of peaks 1 to 7, based on the amount of 2,4- and 2,6-diamino-1-methylcyclohexane used, adds up to 100%.

In an advantageous inventive composition, the hydrogenation is performed in the melt at mean temperatures of a ≥240° C. and the GC area percentages are
for peak 1 in the range from 46.0 to 49.0%
for peak 2 in the range from 5.7 to 9.0%
for peak 3 in the range from 16.2 to 19.0%
for peak 4 in the range from 11.0 to 16.8%
for peak 5 in the range from 5.1 to 6.5%
for peak 6 in the range from 8.0 to 12.0%
for peak 7 in the range from 1.0 to 2.4%,
where the sum of the GC area percentages of peaks 1 to 7, based on the amount of 2,4- and 2,6-diamino-1-methylcyclohexane used, adds up to 100%.

In an advantageous inventive composition, the hydrogenation is performed in solution at mean temperatures in the range from 170 to 209° C. and the GC area percentages are
for peak 1 in the range from 22.4 to 33.4%
for peak 2 in the range from 1.7 to 3.3%
for peak 3 in the range from 12.9 to 14.0%
for peak 4 in the range from 22.8 to 25.0%
for peak 5 in the range from 6.6 to 7.7%
for peak 6 in the range from 15.8 to 26.3%
for peak 7 in the range from 2.5 to 5.4%,
where the sum of the GC area percentages of peaks 1 to 7, based on the amount of 2,4- and 2,6-diamino-1-methylcyclohexane used, adds up to 100%.

In an advantageous inventive composition, the hydrogenation is performed in solution at mean temperatures in the range from 150 to 169° C. and the GC area percentages are
for peak 1 in the range from 8.0 to 22.3%
for peak 2 in the range from 0.3 to 1.6%
for peak 3 in the range from 11.5 to 12.8%
for peak 4 in the range from 27.9 to 30.0%
for peak 5 in the range from 3.0 to 5.0%
for peak 6 in the range from 26.4 to 36.8%
for peak 7 in the range from 5.5 to 8.4%,
where the sum of the GC area percentages of peaks 1 to 7, based on the amount of 2,4- and 2,6-diamino-1-methylcyclohexane used, adds up to 100%.

In an advantageous inventive composition, the hydrogenation is performed in solution at mean temperatures in the range from 130 to 149° C. and the GC area percentages are
for peak 1 in the range from 4.0 to 7.9%
for peak 2 in the range from 0.3 to 1.6%
for peak 3 in the range from 9.0 to 11.4%
for peak 4 in the range from 25.1 to 27.8%
for peak 5 in the range from 7.8 to 10.0%
for peak 6 in the range from 36.9 to 40.0%
for peak 7 in the range from 8.5 to 10.0%,
where the sum of the GC area percentages of peaks 1 to 7, based on the amount of 2,4- and 2,6-diamino-1-methylcyclohexane used, adds up to 100%.

The "mean temperature" is defined as the arithmetic mean of the reactor inlet temperature and the reactor outlet temperature. The inlet and outlet temperatures preferably do differ by not more than 10° C.

In an advantageous inventive composition, the hydrogenation has been performed batchwise.

In an advantageous inventive composition, the hydrogenation has been performed continuously.

In an advantageous inventive composition, the epoxy resin is selected from the group of glycide polyethers, glycide polyesters and glycide amines.

In an advantageous inventive composition, the stoichiometric ratio of epoxy groups to reactive hydrogen on an amine group in the inventive mixture is in the range from 0.7 to 1.2.

The invention further provides a process for preparing the inventive composition, wherein the epoxy resin is mixed with the mixture at temperatures in the range from 0° C. to 70° C.

The invention further provides for the use of the inventive composition for producing hardened epoxy resins.

The invention further provides for the use of the inventive composition as an adhesive.

The invention further provides for the use of the inventive composition for producing moldings.

The invention further provides a hardened epoxy resin obtainable by hardening the composition.

The invention further provides an adhesive comprising the inventive composition.

The invention further provides a molding obtainable by hardening the inventive composition in a mold.

The invention further provides a mixture comprising the 7 isomers of 2,4- and 2,6-diamino-1-methylcyclohexane in a ratio of 75 to 95% by weight of 2,4- to 5 to 25% by weight of 2,6-diamino-1-methylcyclohexane, wherein the GC area percentages of the 7 isomers, in order of ascending retention time, are determined by gas chromatography with a column of length 30 m, internal diameter 0.25 mm and film thickness 0.5 μm, which is operated with helium as the mobile phase and comprises 35% by weight of diphenyl and 65% by weight of dimethylpolysiloxane as the stationary phase, is operated at temperatures in the range from 100 to 250° C. over the entire measurement, and a flame ionization detector which is operated at 280° C. is used, by dissolving the mixture comprising 7 isomers, after distillation, in tetrahydrofuran, injecting the solution into the gas chromatograph with an injection temperature of 100° C., an inlet pressure of 1 bar and a heating rate of 1° C./min is established until a temperature of 120° C. is attained, then the heating rate is switched to 5° C./min and maintained until the end temperature of 250° C., then the temperature of 250° C. is held for 10 min, and the rate of the helium enriched with the mixture of 40 ml/min is established over the entire measurement and the measurement is conducted with a split ratio of 1 to 40, and are
for peak 1 in the range from 4.0 to 49.0%,
for peak 2 in the range from 0.3 to 9.0%,
for peak 3 in the range from 9.0 to 19.0%
for peak 4 in the range from 11.0 to 30.0%,
for peak 5 in the range from 3.0 to 10.0%
for peak 6 in the range from 8.0 to 40.0% and
for peak 7 in the range from 1.0 to 10.0%, where the sum of the GC area percentages based on the amount of 2,4- and 2,6-diamino-1-methylcyclohexane used adds up to 100%, and
a mixture comprising the 7 isomers of 2,4- and 2,6-diamino-1-methylcyclohexane in a ratio of 75 to 95% by weight of 2,4- to 5 to 25% by weight of 2,6-diamino-1-methylcyclohexane, the GC area percentages of which, in order of ascending retention time, determined by the same gas chromatography method, are,
for peak 1 in the range from 15.6 to 16.6%,
for peak 2 in the range from 0.1 to 0.4%,
for peak 3 in the range from 32.2 to 33.2%
for peak 4 in the range from 23.5 to 24.5%
for peak 5 in the range from 4.1 to 5.1%
for peak 6 in the range from 18.1 to 19.1% and
for peak 7 in the range from 2.6 to 3.6%, where the sum of the GC area percentages of peaks 1 to 7, based on the amount of 2,4- and 2,6-diamino-1-methylcyclohexane used, adds up to 100%, is excluded.

In an advantageous inventive mixture, the 7 isomers of 2,4- and 2,6-diamino-1-methylcyclohexane are obtainable by hydrogenating a mixture comprising 75 to 85% by weight of 2,4-toluenediamine and 15 to 25% by weight of 2,6-toluenediamine by means of an aluminum oxide-supported ruthenium-comprising catalyst at temperatures, i.e. at mean temperatures, in the range from 130 to ≥240° C.

The invention further provides for the use of the inventive mixture for preparing the inventive composition.

The inventive composition comprises at least one epoxy resin and a mixture comprising the 7 isomers of 2,4- and 2,6-diamino-1-methylcyclohexane in a ratio of 75 to 95% by weight of 2,4- to 5 to 25% by weight of 2,6-diamino-1-methylcyclohexane.

For the inventive composition, the epoxy resins are selected from the group of polyglycidyl polyethers, polyglycidyl polyesters and polyglycidyl amines. The epoxy resins and/or epoxy resin mixtures for use preferably comprise epoxy resins selected from the group of bisphenol A bisglycidyl ether (DGEBA), bisphenol F bisglycidyl ether, bisphenol S bisglycidyl ether (DGEBS), tetraglycidylmethylenedianiline (TGMDA), epoxy novolacs (the reaction products of epichlorohydrin and phenol resins (novolac)) and cycloaliphatic epoxy resins such as 3,4-epoxycyclohexylmethyl 3,4-epoxycyclohexanecarboxylate and diglycidyl hexahydrophthalate.

In addition, the epoxy resins may also comprise further reactive diluents. These are selected from the group of 1,4-butanediol bisglycidyl ether, 1,6-hexanediol bisglycidyl ether, glycidyl neodecanoate, glycidyl versatate, 2-ethylhexyl glycidyl ether, $C_8$-$C_{10}$-alkyl glycidyl ether, $C_{12}$-$C_{14}$-alkyl glycidyl ether, p-tert-butyl glycidyl ether, butyl glycidyl ether, nonylphenyl glycidyl ether, p-tert-butylphenyl glycidyl ether, phenyl glycidyl ether, o-cresyl glycidyl ether, polyoxypropylene glycol diglycidyl ether, trimethylolpropane triglycidyl ether (TMP), glyceryl triglycidyl ether and triglycidylparaaminophenol (TGPAP).

The mixture, present in the composition, of 7 isomers of 2,4- and 2,6-diamino-1-methylcyclohexane in a ratio of 75 to 95% by weight of 2,4- to 5 to 25% by weight of 2,6-diamino-1-methylcyclohexane is obtained by hydrogenating a mixture of 75 to 85% by weight of 2,4-toluenediamine (2,4-TDA) and 15 to 25% by weight of 2,6-toluenediamine (2,6-TDA). Preference is given to a mixture of 2,4- to 2,6-TDA in the range from 77 to 83% by weight to 17 to 23% by weight. The hydrogenation of this mixture of 2,4- and 2,6-TDA to the inventive mixture comprising 7 isomers of 2,4- and 2,6-diamino-1-methylcyclohexane (MDACH) proceeds in one stage. The by-products obtained are in particular low boilers after deamination, which can be removed by distillation, as shown in scheme 1. A mixture of 2,4- and 2,6-diamino-1-methylcyclohexane is referred to as MDACH.

Scheme 1:

Hydrogenation of 2,4- and 2,6-TDA to MDACH and possible by-products

Reaction:

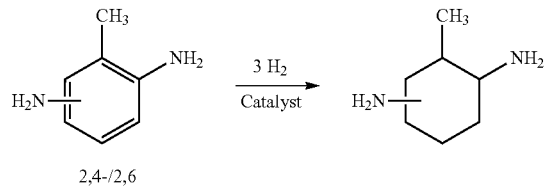

2,4-/2,6

Possible by-products:
Low boilers:

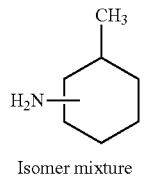

Isomer mixture

This gives a mixture of the following isomers:
2,4-Diamino-1-methylcyclohexane:

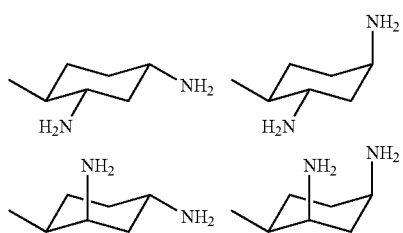

2,6-Diamino-1-methylcyclohexane:

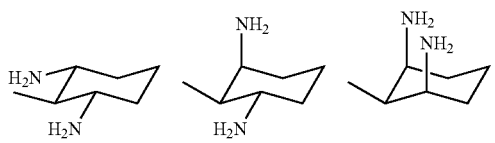

The mixture of these 7 isomers can be analyzed by gas chromatography. For this purpose, the inventive mixture which comprises the 7 isomers of 2,4- and 2,6-diamino-1-methylcyclohexane in a ratio of 75 to 95% by weight of 2,4- to 5 to 25% by weight of 2,6-diamino-1-methylcyclohexane is purified by distillation. For the distillation, any distillation column known to those skilled in the art can be used. Preference is given to a column with wire mesh random packing. Particular preference is given to those randomly packed columns which have at least 5 theoretical plates. Preference is given to performing the distillation under reduced pressure, more preferably at pressures in the range from 5 to 15 mbar. When the distillation is performed in the range from 5 to 15 mbar, the isomer mixture of the 7 isomers of 2,4- and 2,6-diamino-1-methylcyclohexane (MDACH) is obtained at temperatures in the range from 75 to 90° C. as the top product. The product obtained, which comprises more than 95% by weight of MDACH, is subsequently dissolved in THF. This solution is injected into the gas chromatograph using a syringe. The gas chromatograph is equipped with a column of length 30 m, internal diameter 0.25 mm and film thickness 0.5 μm. The column itself comprises, as the stationary phase, 35% by weight of diphenyl and 65% by weight of dimethylpolysiloxane. As a preferred column, the RTX35-Amine column from Resteck Corporation is used. The carrier gas or mobile phase used is helium. The flow rate of the helium is set to 40 ml/min, so as to have, with a set split ratio (division ratio) of 40:1, a constant flow of 1 ml/min of He through the column. The gas chromatograph has a flame ionization detector, which is operated at 280° C., for determination of the substances to be analyzed. The column in the gas chromatograph is operated at a temperature in the range from 100 to 250° C. In order to be able to determine the area percentages of the peaks to be determined, a defined amount of a standard is added to the distilled inventive mixture dissolved in THF. The actual area percentages of the peaks 1 to 7 of the 7 isomers of 2,4- and 2,6-diamino-1-methylcyclohexane are compared with the area percentages of the standard. The distilled inventive mixture which has been dissolved in THF and admixed with the standard is injected into the column with an injection temperature of 100° C. and an inlet pressure of 1 bar. At first, a heating rate of 1° C./min is established, which is maintained until a column temperature of 120° C. is attained. As soon as this temperature has been attained, the heating rate of the column is switched to 5° C./min and maintained until the end temperature of 250° C. Subsequently, the column temperature is held at 250° C. for 10 min.

According to the process just described, the following retention times are found for peaks 1 to 7 of the 7 isomers of 2,4- and 2,6-diamino-1-methylcyclohexane, in order of ascending retention time:
for peak 1 15.3 min,
for peak 2 15.5 min,
for peak 3 15.7 min,
for peak 4 16.2 min,
for peak 5 16.4 min,
for peak 6 17.4 min,
for peak 7 18.2 min, where the deviation of the retention time is ±3%.

According to how the hydrogenation conditions are selected, the result is different percentages of the 7 isomers of 2,4- and 2,6-diamino-1-methylcyclohexane relative to one another in the resulting inventive mixture. In the case of use of the inventive mixture in the inventive composition, these lead to different hardening behavior.

The GC area proportion of peak 1 of the 7 isomers of 2,4- and 2,6-diamino-1-methylcyclohexane, determined by gas chromatography by the above-described method, is preferably in the range from 4.0 to 49.0% at hydrogenation temperatures in the range from 130 to ≥240° C., in the range from 4.0 to 7.9% at hydrogenation temperatures in the range from 130 to 149° C., in the range from 8.0 to 22.3% at hydrogenation temperatures in the range from 150 to 169° C., in the range from 22.4 to 33.4% at hydrogenation temperatures in the range from 170 to 209° C., in the range from 33.5 to 46.0% at hydrogenation temperatures in the range from 210 to 239° C. and in the range from 46.0 to 49.0% at hydrogenation temperatures in the range of ≥240° C., excluding a peak 1 which has in the range from 15.6 to 16.6 GC area percent and has been determined by the above GC method.

The GC area proportion of peak 2 of the 7 isomers of 2,4- and 2,6-diamino-1-methylcyclohexane, determined by gas chromatography by the above-described method, is preferably in the range from 0.3 to 9.0% at hydrogenation temperatures in the range from 130 to ≥240° C., in the range from 0 to 1.6% at hydrogenation temperatures in the range from 130 to 169° C., in the range from 1.7 to 3.3% at hydrogenation temperatures in the range from 170 to 209° C., in the range from 3.4 to 8.7% at hydrogenation temperatures in the range from 210 to 239° C. and in the range from 5.7 to 9.0% at hydrogenation temperatures in the range of ≥240° C., excluding a peak 2 which has in the range from 0.1 to 0.4 GC area percent and has been determined by the above GC method.

The GC area proportion of peak 3 of the 7 isomers of 2,4- and 2,6-diamino-1-methylcyclohexane, determined by gas chromatography by the above-described method, is preferably in the range from 9.0 to 19.0% at hydrogenation temperatures in the range from 130 to ≥240° C., in the range from 9.0 to 11.4% at hydrogenation temperatures in the range from 130 to 149° C., in the range from 11.5 to 12.8% at hydrogenation temperatures in the range from 150 to 169° C., in the range from 12.9 to 14.0% at hydrogenation temperatures in the range from 170 to 209° C., in the range from 14.1 to 19.0% at hydrogenation temperatures in the range from 210 to 239° C. and in the range from 16.2 to 19.0% at hydrogenation temperatures in the range of ≥240° C., excluding a peak 3 which has in the range from 32.2 to 33.2 GC area percent and has been determined by the above GC method.

The GC area proportion of peak 4 of the 7 isomers of 2,4- and 2,6-diamino-1-methylcyclohexane, determined by gas chromatography by the above-described method, is preferably in the range from 11.0 to 30.0% at hydrogenation temperatures in the range from 130 to ≥240° C., in the range from 25.1 to 27.8% at hydrogenation temperatures in the range from 130 to 149° C., in the range from 27.9 to 30.0% at hydrogenation temperatures in the range from 150 to 169° C., in the range from 22.8 to 25.0% at hydrogenation temperatures in the range from 170 to 209° C., in the range from 12.1 to 22.7% at hydrogenation temperatures in the range from 210 to 239° C. and in the range from 11.0 to 16.8% at hydrogenation temperatures in the range of 240° C., excluding a peak 4 which has in the range from 23.5 to 24.5 GC area percent and has been determined by the above GC method.

The GC area proportion of peak 5 of the 7 isomers of 2,4- and 2,6-diamino-1-methylcyclohexane, determined by gas chromatography by the above-described method, is preferably in the range from 3.0 to 10.0% at hydrogenation temperatures in the range from 130 to ≥240° C., in the range from 7.8 to 10.0% at hydrogenation temperatures in the range from 130 to 149° C., in the range from 3.0 to 5.0% at hydrogenation temperatures in the range from 150 to 169° C., in the range from 5.5 to 7.7% at hydrogenation temperatures in the range from 170 to 239° C., and in the range from 5.1 to 6.5% at hydrogenation temperatures in the range of ≥240° C., excluding a peak 5 which has in the range from 4.1 to 5.1 GC area percent and has been determined by the above GC method.

The GC area proportion of peak 6 of the 7 isomers of 2,4- and 2,6-diamino-1-methylcyclohexane, determined by gas chromatography by the above-described method, is preferably in the range from 8.0 to 40.0% at hydrogenation temperatures in the range from 130 to ≥240° C., in the range from 36.9 to 40.0% at hydrogenation temperatures in the range from 130 to 149° C., in the range from 26.4 to 36.8% at hydrogenation temperatures in the range from 150 to 169° C., in the range from 15.8 to 26.3% at hydrogenation temperatures in the range from 170 to 209° C., in the range from 8.7 to 15.7% at hydrogenation temperatures in the range from 210 to 239° C. and in the range from 8.0 to 12.0% at hydrogenation temperatures in the range of ≥240° C., excluding a peak 6 which has in the range from 18.1 to 19.1 GC area percent and has been determined by the above GC method.

The GC area proportion of peak 7 of the 7 isomers of 2,4- and 2,6-diamino-1-methylcyclohexane, determined by gas chromatography by the above-described method, is preferably in the range from 1.0 to 10.0% at hydrogenation temperatures in the range from 130 to ≥240° C., in the range from 8.5 to 10.0% at hydrogenation temperatures in the range from 130 to 149° C., in the range from 5.5 to 8.4% at hydrogenation temperatures in the range from 150 to 169° C., in the range from 2.5 to 5.4% at hydrogenation temperatures in the range from 170 to 239° C., and in the range from 1.0 to 3.2% at hydrogenation temperatures in the range of ≥240° C., excluding a peak 7 which has in the range from 2.6 to 3.6 GC area percent and has been determined by the above GC method.

For all GC area percentages of peaks 1 to 7 of the inventive mixture and of peaks 1 to 7 which are excluded from the inventive mixture, the sum of the area percentages of peaks 1 to 7 is 100%, based on the amount of MDACH used.

The hydrogenation can be carried out with all hydrogenation catalysts known to those skilled in the art, such as catalysts comprising rhodium, ruthenium, palladium, platinum or nickel. Preference is given to ruthenium-comprising catalysts for hydrogenation. Particular preference is given to ruthenium oxide hydrate catalysts and ruthenium catalysts on supports, suitable support materials being aluminum oxide, silicon oxide and carbon.

The hydrogenation can be performed in suspension or in solution or in the melt, or over a fixed bed catalyst in solution or in the melt. Irrespective of the way in which the hydrogenation catalyst is used, the process can be performed batchwise or continuously. The hydrogenation should preferably be performed continuously in suspension in the melt.

The hydrogenation of the 2,4- and 2,6-TDA in a ratio of 75 to 85% by weight of 2,4- to 15 to 25% by weight of 2,6-TDA can be effected at temperatures in the range from 130 to ≥240° C. Preference is given to temperatures in the range from 130 to 270° C., particular preference to those in the range from 140 to 250° C. For hydrogenation in suspension, temperatures in the range from 140 to 270° C. are preferred. Particular preference is given to temperatures in the range from 200 to 250° C. for the suspension. For hydrogenation with a fixed bed catalyst, the temperatures are preferably in the range from 130 to 250° C., more preferably in the range from 140 to 180° C.

The pressure during the hydrogenation of the 2,4- and 2,6-TDA in a ratio of 75 to 85% by weight of 2,4- to 15 to 25% by weight of 2,6-TDA is in the range from 90 to 350 bar, preferably in the range from 100 to 300 bar. For the hydrogenation in suspension, the pressure is preferably in the range from 150 to 300 bar, more preferably in the range from 200 to 250 bar. For the hydrogenation in a fixed bed, the pressure is preferably in the range from 100 to 300 bar, more preferably in the range from 150 to 250 bar.

According to the conditions under which the hydrogenation is performed, the ratio of the 2,4- and 2,6-TDA in the range from 75 to 85% by weight of 2,4- to 15 to 25% by weight of 2,6-TDA may vary to a 2,4- and 2,6-diamino-1-methylcyclohexane ratio in the range from 75 to 95% by weight of 2,4- to 5 to 25% by weight of 2,6-diamino-1-methylcyclohexane. The ratios of 2,4- to 2,6-TDA therefore need not correspond to the ratio of 2,4- to 2,6-diamino-1-methylcyclohexane, but are within a range from 75 to 95% by weight of 2,4- to 15 to 25% by weight of 2,6-diamino-1-methylcyclohexane.

The inventive mixture comprising the 7 Isomers of 2,4- and 2,6-diamino-1-methylcyclohexane may comprise further hardeners known to those skilled in the art for epoxides. These further hardeners are selected from the group of amines, anhydrides and imidazoles.

The stoichiometric ratio of epoxy groups (according to epoxy equivalent weight EEW) to amino groups (according to active hydrogen equivalent weight ANEW) of the mixture comprising 2,4- and 2,6-diamino-1-methylcyclohexane is in the range from 0.7:1 to 1.2:1, more preferably in the range from 0.9:1 to 1.1:1.

In the inventive composition, further fillers may be present either in the mixture and/or else in the epoxy resin. Further fillers are understood to mean fiber-reinforcing material, thixotropic agents (hydrophilic and hydrophobic fumed silicas), UV stabilizers (nanoscale oxides such as titanium dioxide and zinc oxide), flame retardants (polyphosphates and phosphorus), silicates and carbonates. The fiber-reinforcing materials can be used in the form of fabrics, uni- and multiaxial scrims, nonwovens and short fibers. The fiber-reinforcing materials are selected from the group of glass fibers, carbon fibers, aramid fibers, PE fibers (Dyneema) and basalt fibers. Preference is given to fabrics and uni- and multiaxial scrims composed of glass fibers and carbon fibers. Particular preference is given to uni- and multiaxial scrims composed of glass fibers. The blade shells for wind turbines are preferably constructed with glass fiber scrims.

The thus obtained inventive mixture of 7 isomers of 2,4- and 2,6-diamino-1-methylcyclohexane in a ratio of 75 to 95% by weight of 2,4- to 5 to 25% by weight of 2,6-diamino-1-methylcyclohexane can be used with at least epoxy resin in the inventive composition for differently hardened epoxy resins. In this case, the selection of a specific mixture with a particular ratio of the individual 7 isomers relative to one another can determine the hardening time of the composition such that large components are just filled completely by the still free-flowing composition before the onset of hardening makes penetration of the entire component impossible.

The inventive composition can be used to produce hardened epoxy resins, moldings and composite materials. The inventive composition can, however, also be used as an adhesive.

Preferred moldings and composite materials are selected from the group of blades for wind turbines, components for automotive applications such as roof surfaces and bodywork parts, applications in boatbuilding and aircraft construction, and production of "tooling" molds. In addition to the composite materials and moldings, floor coverings and coatings should also be mentioned as preferred applications. For coatings, it may be advantageous to allow a portion of the amino groups of the inventive composition composed of isomers of diaminomethylcyclohexane to react beforehand with epoxy groups (known as adducting). Particular preference is given to blades for wind turbines and floor coatings.

EXAMPLES

Hydrogenation Examples

Suspension Hydrogenations

Example 1

Preparation of the Suspension Catalyst RuO(OH)$_x$

Preparation according to DE-A 2132547, according to example 1.

Example 2

Hydrogenation of 2,4-/2,6-TDA

In a 3.5 l pressure reactor, 1.2 g of the Ru suspension catalyst prepared in example 1 were suspended in 1.8 l of a 30% solution of 2,4-/2,6-TDA in THF. The hydrogenation was performed with pure hydrogen at a constant pressure of 200 bar and a temperature of 220° C. Hydrogenation was continued until no further hydrogen was taken up (12 hours). The reactor was subsequently decompressed. The TDA conversion was 99.9%, the selectivity based on MDACH was 91.1%, and the low boiler content by deamination (methylaminocyclohexanes) was 8.4%. The discharge was purified by distillation at 10 mbar and 80-85° C.

Composition: MDACH (99.9%), see table 2 for isomer ratios.

Example 3

Hydrogenation of 2,4-/2,6-TDA

In a 3.5 l pressure reactor, 8.0 g of the Ru suspension catalyst prepared in example 1 were suspended in 1.8 l of a 30% solution of 2,4-/2,6-TDA in THF. The hydrogenation was performed with pure hydrogen at a constant pressure of 200 bar and a temperature of 180° C. Hydrogenation was continued until no further hydrogen was taken up (10 hours). The reactor was subsequently decompressed. The TDA conversion was 99.9%, the selectivity based on MDACH was 97.6%, and the low boiler content by deamination (methylaminocyclohexanes) was 2.2%. The discharge was purified by distillation at 10 mbar and 80-85° C.

Composition: MDACH (99.8%), see table 2 for isomer ratios.

Example 4

Hydrogenation of 2,4-/2,6-TDA

In a 3.5 l pressure reactor, 8.0 g of the Ru suspension catalyst prepared in example 1 were suspended in 1.8 l of a 30% solution of 2,4-/2,6-TDA in THF. The hydrogenation was performed with pure hydrogen at a constant pressure of 200 bar and a temperature of 160° C. Hydrogenation was continued until no further hydrogen was taken up (12 hours). The reactor was subsequently decompressed. The TDA conversion was 99.4%, the selectivity based on MDACH was 98.0%, and the low boiler content by deamination (methylaminocyclohexanes) was 1.3%. The discharge was purified by distillation at 10 mbar and 80-85° C.

Composition: MDACH (99.9%), see table 2 for isomer ratios.

Example 5

Hydrogenation of 2,4-/2,6-TDA

In a 3.5 l pressure reactor, 8.0 g of the Ru suspension catalyst prepared in example 1 were suspended in 1.8 l of a 30% solution of 2,4-/2,6-TDA in THF. The hydrogenation was performed with pure hydrogen at a constant pressure of 200 bar and a temperature of 140° C. Hydrogenation was continued until no further hydrogen was taken up (40 hours). The reactor was subsequently decompressed. The TDA conversion was 99.3%, the selectivity based on MDACH was 97.7%, and the low boiler content by deamination (methylaminocyclohexanes) was 1.5%. The discharge was purified by distillation at 10 mbar and 80-85° C.

Composition: MDACH (99.9%), see table 2 for isomer ratios.

Example 6

Hydrogenation of 2,4-/2,6-TDA

In a continuous laboratory apparatus consisting of two tubular reactors connected in series (main reactor: volume=300 ml, with circulation; postreactor: volume =150 ml, straight pass), a suspension of the Ru catalyst prepared according to example 1 was hydrogenated in a TDA melt (Ru content: 200 ppm) with pure hydrogen at a constant pressure of 200 bar and a mean temperature of 240° C. In the course of this, the TDA melt was supplied at 20-40 g/h. The TDA conversion was 99.3%, the selectivity based on MDACH was 97.7%, and the low boiler content as a result of deamination (methylaminocyclohexanes) was 1.5%. The discharge was purified by distillation at 10 mbar and 80-85° C.

Composition: MDACH (99.6%), see table 2 for isomer ratios.

Fixed Bed Hydrogenation

Example 7

Preparation of the Fixed Bed Catalyst
(0.5%Ru/Al$_2$O$_3$)

Preparation according to DE-A 19624485, (example: Preparation of the catalyst).

Example 8

Hydrogenation of 2,4-/2,6-TDA

A continuous plant consisting of two tubular reactors connected in series (main reactor 150 ml and postreactor 100 ml) was charged with the Ru/Al$_2$O$_3$ catalyst prepared according to example 7. The main reactor was operated in trickle mode with circulation, the postreactor in straight pass in liquid phase mode. TDA solution (20% in THF) (1 ml/min) was pumped with pure hydrogen at a mean temperature of 144° C. in the main reactor and 163° C. in the postreactor and a constant pressure of 200 bar through the reactor cascade. The TDA conversion was 100%, the selectivity based on MDACH was 59.7%, and the low boiler content as a result of deamination (methylamino-cyclohexanes) was 33.3%. The discharge was purified by distillation at 10 mbar and 80-85° C.

Composition: MDACH (99.9%), see table 2 for isomer ratios.

Example 9

Hydrogenation of 2,4-/2,6-TDA

The hydrogenation was conducted analogously to example 6 at 240 bar and a mean temperature of 235° C. (Ru content 100 ppm). The TDA conversion was 99%, the selectivity based on MDACH was 82%, and the low boiler content as a result of deamination (methylaminocyclohexanes) was 18%. The discharge was purified by distillation.

Composition: MDACH (99.8%), see table 2 for isomer ratios.

Gas Chromatography Analyses

The reaction discharges and the pure materials were analyzed by means of gas chromatography.

TABLE 1

| Retention times of the compounds: | |
| --- | --- |
| Retention time [min] | Compound |
| 5.6-6.5 | Low boilers (aminomethylcyclohexanes) |
| 15.3 | MDACH peak 1 |
| 15.5 | MDACH peak 2 |
| 15.7 | MDACH peak 3 |
| 16.2 | MDACH peak 4 |
| 16.4 | MDACH peak 5 |
| 17.4 | MDACH peak 6 |
| 18.2 | MDACH peak 7 |
| 33.1 | 2,4-TDA |
| 33.4 | 2,6-TDA |

For the gas chromatography analyses, a sample comprising 2,4- and 2,6-diamino-1-methylcycylohexane in a ratio of 75 to 95% by weight of 2,4- to 5 to 25% by weight of 2,6-diamino-1-methylcyclohexane (distilled material) is diluted with THF in a ratio of 1:5. 0.5 µl of this diluted sample is applied by means of a Hamilton syringe in a gas chromatogram (HP 6890) to an RTX35 Amine column from Restek Corporation (stationary phase: 35% by weight of diphenyls, 65% by weight of dimethylpolysiloxanes; length: 30 m; internal diameter: 0.25 mm; film thickness: 0.5 µm) at temperatures in the range from 100 to ≥250° C. (oven: injection temperature: 100° C.; heating rate: 1° C./min up to temperature 120° C.; heating rate: 5° C./min up to end temperature 250° C., left at 250° C. for 10 min) and a set flow rate of 40 ml/min (carrier gas: helium; inlet pressure: 1 bar; split ratio: 1:40). The flame ionization detector is operated at 280° C.

TABLE 2

Isomer distribution in the inventive mixture as a function of the reaction conditions
Composition of the inventive mixture specimen (after distillation) from the examples
(figures in GC area percent):

| MDACH | Ex. 2 (220° C.) | Ex. 3 (180° C.) | Ex. 4 (160° C.) | Ex. 5 (140° C.) | Ex. 6 (240° C.) Susp. continuous in the melt | Ex. 8 Fixed bed continuous in THF | Ex. 9 (235° C.) Susp. continuous in the melt | Comp. (Rh/Al$_2$O$_3$, 150° C.) EP-B 0443344 batch in THF |
| --- | --- | --- | --- | --- | --- | --- | --- | --- |
| | Suspension, batch, in THF | | | | | | | |
| Peak 1 | 34.6 | 32.4 | 10.3 | 5.7 | 46.6 | 22.4 | 43.4 | 16.1 |
| Peak 2 | 4.0 | 2.8 | 0.6 | 0.7 | 7.5 | 1.8 | 6.1 | 0.1 |
| Peak 3 | 14.7 | 13.5 | 12.2 | 10.8 | 16.4 | 13.3 | 17.8 | 32.7 |
| Peak 4 | 21.0 | 24.6 | 28.1 | 27.6 | 12.9 | 26.7 | 13.8 | 24.0 |
| Peak 5 | 6.9 | 6.7 | 4.8 | 8.8 | 5.4 | 6.8 | 6.2 | 4.6 |
| Peak 6 | 15.2 | 16.5 | 36.3 | 37.3 | 9.0 | 23.4 | 10.3 | 18.6 |
| Peak 7 | 3.5 | 3.3 | 7.6 | 9.0 | 1.8 | 5.5 | 2.2 | 3.1 |

Comparative Example

Reworking of Example 3 From EP 0 443 344 B1 (Air Products)

Example 3 from EP 0 443 344 B1 was reworked using the procedure of example 1 from EP 0 443 344 B1. Since the experiments were carried out in a 3.5 l autoclave instead of a 2 l autoclave, all amounts were multiplied by the factor of 1.75. The discharge was purified by distillation at 10 mbar and 80-85° C.

Composition: Mixture of 2,4- and 2,6-diamino-1-methyl-cyclohexane (99.2%), see table 2 for isomer ratios.

Use results of the different examples 2, 5, 8 and 9:
General procedure for production of the pure resin slabs:
The inventive composition comprises an epoxy resin and the mixture in a ratio of 100:17
In this case, the following epoxy resin was used:
Bisphenol A resin with EEW=187
  350 g of resin
  59.5 g of hardener
Procedure:

The mixture was introduced into a 1 l chemical bottle in each case and stirred with a propeller stirrer at 300 rpm for approx. 10 min. Subsequently, the composition was poured into an aluminum mold of 23×35 cm. The aluminum molds are separated from one another by silicone seals of thickness 4 mm and, before being filled with the inventive composition, were wiped with the release agent PAT 623/B on a cloth. After introducing the inventive composition, the molds are held together with clamps.

The resin slabs are hardened at 80° C. for 2 h and then in a heated ventilated cabinet at 150° C. for 3 h.

In order to study the influence of the stereoisomer distribution of the MDACH, three different MDACH samples from table 2 were used.
Example 2
Example 5
Example 8
Example 9

A DSC run was done in each case in order to determine the reaction profile (onset, Delta H, Peak max, Tg DSC).

A slab was cast in each case and hardened in the oven (2 h at 80° C. and 3 h at 150° C.) and then analyzed (Tg of slab by DSC, tensile test, bending test).

A mixture was made up in the rotational viscometer in each case, in order to determine the pot life at 23° C. The pot life is the time at RT that the system needs to attain a viscosity of 10 000 mPas. The gel point has then been attained. This is the actual processing time or open time.
Temperature Program For DSC
1st run
Start at 0° C., then heat at 5 K/min to 180° C. Hold at 180° C. for 3 min. Cool at 20 K/min to 0° C.
2nd run
Heat from 0° C. at 20 K/min to 200° C.

TABLE 3

| Hardener | DELTA H | Onset (DSC) | Peak max. (DSC) | TG DSC run | Tg of slab (DSC) |
|---|---|---|---|---|---|
| Ex. 2 | 396.1 J/g | 68.9° C. | 106.8° C. | 154.7° C. | 153.4° C. |
| Ex. 5 | 405.3 J/g | 71.6° C. | 102.7° C. | 146.6° C. | 148.2° C. |
| Ex. 8 | 412.9 J/g | 72.4° C. | 103.8° C. | 144.8° C. | 151.1° C. |
| Ex. 9 | 367.6 J/g | 76.3° C. | 104.9° C. | 154.4° C. | 159.3° C. |

TABLE 3-continued

| Hardener | Time until 10000 mPas attained at 23° C. | Tensile test ISO 527-2: 1996 | | Bending test ISO 178: 2006 | |
|---|---|---|---|---|---|
| | | E-t Mpa | έ_M % | E_f Mpa | έ_fM % |
| Ex. 2 | 143 min | 2910 | 5.49 | 3053 | 6.10 |
| Ex. 5 | 117 min | 2962 | 4.20 | 3065 | 5.58 |
| Ex. 8 | 138 min | 2970 | 4.19 | 3083 | 5.79 |
| Ex. 9 | 159 min | 2963 | 6.97 | 3087 | 6.10 |

Delta H = Reaction enthalpy
Onset (DSC) = Temperature in the DSC program at which the reaction sets in
Peak max (DSC) = Temperature at which the reaction enthalpy is at a maximum
TG (DSC run) = Glass transition temperature determined in the 2nd DSC run
TG of slab (DSC) = Glass transition temperature of a slab hardened in the oven, determined by DSC To determine the reactivity differences, an appropriate amount of resin was mixed with a stoichiometric amount of the hardener, and the hardening behavior in a rotational viscometer at 23° C. was recorded until a value of approx. 10 000 MPas was attained. Table 3 shows that example 2 attained the viscosity value of 10 000 MPas after 143 min, example 5 after 117 min and example 8 after 138 min.
Evaluation of the Results:

The results show that the different hydrogenation temperatures and processes can control the distribution of the stereoisomers.

In the use tests regarding the curing of epoxy resins, it was possible to show that the curing rate of the samples is significantly different. For this purpose, the time until rise to approx. 10 000 MPas was determined in a rotational viscometer. It is thus possible, for example by increasing the hydrogenation temperature, to achieve MDACH mixtures which, in epoxy applications, enable a slowed hardening rate in the initial period (pot life). Slower hardening is desirable, for example, in order to ensure homogeneous distribution, for example, in a composite component.

In addition to pot life, the isomer mixture also has a positive influence on the glass transition temperature. Thus, for example, a higher reaction temperature in the hydrogenation leads not only to longer processing times but at the same time to a product mixture which results in a higher glass transition temperature.

The invention claimed is:
1. A composition, comprising:
a) an epoxy resin; and
b) a mixture comprising 7 isomers of 2,4-diamino-1-methylcyclohexane and 2,6-diamino-1-methylcyclohexane in a ratio of 75 to 95% by weight of 2,4-diamino-1-methylcyclohexane to 5 to 25% by weight of 2,6-diamino-1-methylcyclohexane,
wherein:
GC area percentages of the 7 isomers, in order of ascending retention time, are determined by a gas chromatography method to be
  in a range from 4.0 to 49.0% for a peak 1,
  in a range from 0.3 to 9.0% for a peak 2,
  in a range from 9.0 to 19.0% for a peak 3,
  in a range from 11.0 to 30.0% for a peak 4,
  in a range from 3.0 to 10.0% for a peak 5,
  in a range from 8.0 to 40.0% for a peak 6, and
  in a range from 1.0 to 10.0% for a peak 7,
where the sum of the GC area percentages based on the amount of the 2,4-diamino-methylcyclohexane and the 2,6-diaminomethylcyclohexane totals 100%;
the composition excludes a mixture comprising 7 isomers of 2,4-diamino-1-methyl-cyclohexane and 2,6-di- amino-1-methylcyclohexane in a ratio of 75 to 95% by weight of 2,4-diamino-1-methyl-cyclohexane to 5 to 25% by weight of 2,6-diamino-1-methyl-cyclohexane, wherein GC area percentages of which, in order of ascending retention time, are determined by the gas chromatography method to be
in a range from 15.6 to 16.6% for a first peak,
in a range from 0.1 to 0.4% for a second peak,
in a range from 32.2 to 33.2% for a third peak,
in a range from 23.5 to 24.5% for a fourth peak,
in a range from 4.1 to 5.1% for a fifth peak,
in a range from 18.1 to 19.1% for a sixth peak, and
in a range from 2.6 to 3.6% for a seventh peak,
where the sum of the GC area percentages based on the amount of 2,4-diamino-methylcyclohexane and 2,6-diaminomethylcyclohexane totals 100%;
the gas chromatography method comprises
distilling a mixture comprising isomers and collecting a distilled mixture,
dissolving the distilled mixture into tetrahydrofuran to form an isomeric solution,
injecting the isomeric solution into a column of a gas chromatograph, and
detecting peaks with a flame ionization detector at 280° C.,
wherein:
the column is 30 m in length, has an internal diameter of 0.25 mm, and has a film thickness of 0.5 µm;
the column is operated with helium as a mobile phase and comprises a stationary phase comprising 35% by weight of diphenyl and 65% by weight of dimethylpolysiloxane;
the column is operated at temperatures in a range from 100 to 250° C. during the method;
a rate of helium enrichment is 40 ml/min during the method;
the method is conducted with a split ratio of 1 to 40;
the injecting occurs at an injection temperature of 100° C., an inlet pressure of 1 bar, and at a heating rate of 1° C./min until a temperature of 120° C. is attained;
after a temperature of 120° C. is maintained the heating rate is increased to 5° C./min and is maintained at 5° C./min until a final temperature of 250° C. is reached; and
after the final temperature of 250° C. is reached the final temperature is maintained for 10 min.

2. The composition of claim 1, wherein the 7 isomers of 2,4-diamino-1-methylcyclohexane and 2,6-diamino-1-methylcyclohexane are obtained by hydrogenating a mixture comprising 75 to 85% by weight of 2,4-toluenediamine and 15 to 25% by weight of 2,6-toluenediamine.

3. The composition of claim 2, wherein the hydrogenating occurs in the presence of a ruthenium-comprising catalyst.

4. The composition of claim 2, wherein:
the hydrogenating occurs in solution or on a melt at mean temperatures in the range of ≥210° C.; and
the GC area percentages are
in the range from 33.5 to 49.0% for the peak 1,
in the range from 3.4 to 9.0% for the peak 2,
in the range from 14.1 to 19.0% for the peak 3,
in the range from 11.0 to 22.7% for the peak 4,
in the range from 5.1 to 7.7% for the peak 5,
in the range from 8.0 to 15.7% for the peak 6, and
in the range from 1.0 to 5.4% for the peak 7,
where the sum of the GC area percentages based on the amount of 2,4-diamino-1-methylcyclohexane and 2,6-diamino-1-methylcyclohexane totals 100%.

5. The composition of claim 4, wherein:
the hydrogenating occurs in solution at mean temperatures in the range from 210 to 239° C.; and
the GC area percentages are
in the range from 33.5 to 45.9% for the peak 1,
in the range from 3.4 to 5.6% for the peak 2,
in the range from 14.1 to 16.1% for the peak 3,
in the range from 16.9 to 22.7% for the peak 4,
in the range from 6.6 to 7.7% for the peak 5,
in the range from 12.1 to 15.7% for the peak 6, and
in the range from 2.5 to 5.4% for the peak 7,
where the sum of the GC area percentages based on the amount of 2,4-diamino-1-methylcyclohexane and 2,6-diamino-1-methylcyclohexane totals 100%.

6. The composition of claim 4, wherein:
the hydrogenating occurs on a melt at mean temperatures in the range from 210 to 239° C.; and
the GC area percentages are
in the range from 38.5 to 46.0% for the peak 1,
in the range from 4.7 to 8.7% for the peak 2,
in the range from 14.8 to 19.0% for the peak 3,
in the range from 12.1 to 17.9% for the peak 4,
in the range from 5.5 to 7.1% for the peak 5,
in the range from 8.7 to 13.2% for the peak 6, and
in the range from 1.4 to 3.2% for the peak 7,
where the sum of the GC area percentages based on the amount of 2,4-diamino-1-methylcyclohexane and 2,6-diamino-1-methylcyclohexane totals 100%.

7. The composition of claim 4, wherein:
the hydrogenating occurs on a melt at mean temperatures of >240° C.; and
the GC area percentages are
in the range from 46.0 to 49.0% for the peak 1,
in the range from 5.7 to 9.0% for the peak 2,
in the range from 16.2 to 19.0% for the peak 3,
in the range from 11.0 to 16.8% for the peak 4,
in the range from 5.1 to 6.5% for the peak 5,
in the range from 8.0 to 12.0% for the peak 6, and
in the range from 1.0 to 2.4% for the peak 7,
where the sum of the GC area percentages based on the amount of 2,4-diamino-1-methylcyclohexane and 2,6-diamino-1-methylcyclohexane totals 100%.

8. The composition of claim 2, wherein:
the hydrogenating occurs in solution at mean temperatures in the range from 170 to 209° C.; and
the GC area percentages are
in the range from 22.4 to 33.4% for the peak 1,
in the range from 1.7 to 3.3% for the peak 2,
in the range from 12.9 to 14.0% for the peak 3,
in the range from 22.8 to 25.0% for the peak 4,
in the range from 6.6 to 7.7% for the peak 5,
in the range from 15.8 to 26.3% for the peak 6, and
in the range from 2.5 to 5.4% for the peak 7,
where the sum of the GC area percentages based on the amount of 2,4-diamino-1-methylcyclohexane and 2,6-diamino-1-methylcyclohexane totals 100%.

9. The composition of claim 2, wherein:
the hydrogenating occurs in solution at mean temperatures in the range from 150 to 169° C.; and
the GC area percentages are
in the range from 8.0 to 22.3% for the peak 1,
in the range from 0.3 to 1.6% for the peak 2,
in the range from 11.5 to 12.8% for the peak 3,
in the range from 27.9 to 30.0% for the peak 4,
in the range from 3.0 to 5.0% for the peak 5,
in the range from 26.4 to 36.8% for the peak 6, and
in the range from 5.5 to 8.4% for the peak 7, where the sum of the GC area percentages based on the amount of 2,4-diamino-1-methylcyclohexane and 2,6-diamino-1-methylcyclohexane totals 100%.

10. The composition of claim 2, wherein:
    the hydrogenating occurs in solution at mean temperatures in the range from 130 to 149° C.; and
    the GC area percentages are
        in the range from 4.0 to 7.9% for the peak 1,
        in the range from 0.3 to 1.6% for the peak 2,
        in the range from 9.0 to 11.4% for the peak 3,
        in the range from 25.1 to 27.8% for the peak 4,
        in the range from 7.8 to 10.0% for the peak 5,
        in the range from 36.9 to 40.0% for the peak 6, and
        in the range from 8.5 to 10.0% for the peak 7,
    where the sum of the GC area percentages based on the amount of 2,4-diamino-1-methylcyclohexane and 2,6-diamino-1-methylcyclohexane totals 100%.

11. The composition of claim 2, wherein:
    the hydrogenating occurs over a fixed bed catalyst at a maximum temperature of 155 to 175° C.; and
    the GC area percentages are
        in the range from 21.0 to 25.0% for the peak 1,
        in the range from 1.0 to 3.0% for the peak 2,
        in the range from 11.0 to 16.0% for the peak 3,
        in the range from 23.0 to 29.0% for the peak 4,
        in the range from 5.0 to 8.5% for the peak 5,
        in the range from 20.0 to 25.0% for the peak 6, and
        in the range from 4.0 to 7.0% for the peak 7,
    where the sum of the GC area percentages based on the amount of 2,4-diamino-1-methylcyclohexane and 2,6-diamino-1-methylcyclohexane totals 100%.

12. The composition of claim 1, wherein the epoxy resin is selected from the group consisting of a polyglycidyl polyether, a polyglycidyl polyester and a polyglycidyl amine.

13. The composition of claim 1, wherein a stoichiometric ratio of epoxy groups to reactive hydrogen on amine groups in the mixture is in the range from 0.7:1 to 1.2:1.

14. A process for preparing the composition of claim 1, the process comprising mixing the epoxy resin with the mixture at temperatures in the range from 0° C. to 70° C.

15. A hardened epoxy resin obtained from the composition of claim 1.

16. A hardened epoxy resin obtained by hardening the composition of claim 1.

17. A mixture comprising 7 isomers of 2,4-diamino-1-methylcyclohexane and 2,6-diamino-1-methylcyclohexane in a ratio of 75 to 95% by weight of 2,4-diamino-1-methylcyclohexane to 5 to 25% by weight of 2,6-diamino-1-methylcyclohexane,
    wherein:
    GC area percentages of the 7 isomers, in order of ascending retention time, are determined by a gas chromatography method to be
        in a range from 4.0 to 49.0% for a peak 1,
        in a range from 0.3 to 9.0% for a peak 2,
        in a range from 9.0 to 19.0% for a peak 3,
        in a range from 11.0 to 30.0% for a peak 4,
        in a range from 3.0 to 10.0% for a peak 5,
        in a range from 8.0 to 40.0% for a peak 6, and
        in a range from 1.0 to 10.0% for a peak 7,
    where the sum of the GC area percentages based on the amount of the 2,4-diamino-methylcyclohexane and the 2,6-diaminomethylcyclohexane totals 100%;
    the composition excludes a mixture comprising 7 isomers of 2,4-diamino-1-methyl-cyclohexane and 2,6-diamino-1-methylcyclohexane in a ratio of 75 to 95% by weight of 2,4-diamino-1-methyl-cyclohexane to 5 to 25% by weight of 2,6-diamino-1-methyl-cyclohexane, wherein GC area percentages of which, in order of ascending retention time, are determined by the gas chromatography method to be
        in a range from 15.6 to 16.6% for a first peak,
        in a range from 0.1 to 0.4% for a second peak,
        in a range from 32.2 to 33.2% for a third peak,
        in a range from 23.5 to 24.5% for a forth peak,
        in a range from 4.1 to 5.1% for a fifth peak,
        in a range from 18.1 to 19.1% for a sixth peak, and
        in a range from 2.6 to 3.6% for a seventh peak,
    where the sum of the GC area percentages based on the amount of 2,4-diamino-methylcyclohexane and 2,6-diaminomethylcyclohexane totals 100%;
    the gas chromatography method comprises
        distilling a mixture comprising isomers and collecting a distilled mixture,
        dissolving the distilled mixture into tetrahydrofuran to form an isomeric solution,
        injecting the isomeric solution into a column of a gas chromatograph, and
        detecting peaks with a flame ionization detector at 280° C.,
    wherein:
    the column is 30 m in length, has an internal diameter of 0.25 mm, and has a film thickness of 0.5 μm;
    the column is operated with helium as a mobile phase and comprises a stationary phase comprising 35% by weight of diphenyl and 65% by weight of dimethylpolysiloxane;
    the column is operated at temperatures in a range from 100 to 250° C. during the method;
    a rate of helium enrichment is 40 ml/min during the method;
    the method is conducted with a split ratio of 1 to 40;
    the injecting occurs at an injection temperature of 100° C., an inlet pressure of 1 bar, and at a heating rate of 1° C./min until a temperature of 120° C. is attained;
    after a temperature of 120° C. is maintained the heating rate is increased to 5° C./min and is maintained at 5° C./min until a final temperature of 250° C. is reached; and
    after the final temperature of 250° C. is reached the final temperature is maintained for 10 min.

18. The mixture of claim 17, wherein the 7 isomers of 2,4-diamino-1-methylcyclohexane and 2,6-diamino-1-methylcyclohexane are obtained by hydrogenating a mixture comprising 75 to 85% by weight of 2,4-toluenediamine and 15 to 25% by weight of 2,6-toluenediamine in the presence of an aluminum oxide-supported ruthenium-comprising catalyst at temperatures in the range from 130 to ≥240° C.

19. A composition, comprising:
    a) an epoxy resin; and
    b) the mixture of claim 18.

* * * * *